United States Patent
Takeda

(10) Patent No.: US 10,698,147 B2
(45) Date of Patent: Jun. 30, 2020

(54) POLARIZING ELEMENT

(71) Applicant: Dexerials Corporation, Shinagawa-ku, Tokyo (JP)

(72) Inventor: Tomu Takeda, Tome (JP)

(73) Assignee: Dexerials Corporation, Shinagawa-ku, Tokyo (JP)

(*) Notice: Subject to any disclaimer, the term of this patent is extended or adjusted under 35 U.S.C. 154(b) by 0 days.

(21) Appl. No.: 15/564,503

(22) PCT Filed: Apr. 14, 2016

(86) PCT No.: PCT/JP2016/002023
§ 371 (c)(1),
(2) Date: Oct. 5, 2017

(87) PCT Pub. No.: WO2016/174838
PCT Pub. Date: Nov. 3, 2016

(65) Prior Publication Data
US 2018/0081103 A1  Mar. 22, 2018

(30) Foreign Application Priority Data
Apr. 30, 2015 (JP) .................................. 2015-093351

(51) Int. Cl.
*G02B 5/30* (2006.01)
(52) U.S. Cl.
CPC ......... *G02B 5/3058* (2013.01); *G02B 5/3066* (2013.01)
(58) Field of Classification Search
CPC ...... G02B 5/3058; G02B 5/3025; G02B 5/30; G02B 5/3066; G02B 27/286;
(Continued)

(56) References Cited

U.S. PATENT DOCUMENTS

2012/0105745 A1* 5/2012 Kumai ................. G02B 5/3058
349/5
2013/0120672 A1* 5/2013 Kumai ................. G02F 1/1335
349/5
(Continued)

FOREIGN PATENT DOCUMENTS

CN       101185013 A    5/2008
JP       2007058106 A   3/2007
(Continued)

OTHER PUBLICATIONS

Feb. 16, 2016, Notification of Reasons for Refusal issued by the Japan Patent Office in the corresponding Japanese Patent Application No. 2015-093351.

(Continued)

*Primary Examiner* — Stephone B Allen
*Assistant Examiner* — Jyotsna V Dabbi
(74) *Attorney, Agent, or Firm* — Kenja IP Law PC

(57) ABSTRACT

A polarizing element includes: a transparent substrate; and grid-shaped convexities that are arranged on the transparent substrate at a smaller pitch than a wavelength of operating band light and that extend in a specific direction. The grid-shaped convexities include a reflection layer formed on the transparent substrate and grid tips formed with side surfaces that, when viewed in the specific direction, are inclined in a direction of tip tapering.

5 Claims, 11 Drawing Sheets

(58) Field of Classification Search
CPC .. G02B 27/283; G02B 27/281; G02B 27/144; G02B 27/142; G02B 6/29358; G02B 1/115; G02B 1/113; G02B 1/105; G03F 7/70566; F21V 9/14; B29L 2011/0016; B29L 2031/7224; B29D 11/00413; B29C 2035/0827; B29C 2035/0838; A61F 2002/1686; C23C 18/1603; C23C 14/28; H05K 3/185; C03C 17/10; H01L 39/2409
USPC .................................................. 359/485.05
See application file for complete search history.

(56) References Cited

U.S. PATENT DOCUMENTS

| | | | | |
|---|---|---|---|---|
| 2013/0215507 | A1* | 8/2013 | Sasaki | G02B 5/3058 359/485.05 |
| 2013/0215508 | A1* | 8/2013 | Sasaki | G02B 5/3058 359/488.01 |

FOREIGN PATENT DOCUMENTS

| | | |
|---|---|---|
| JP | 2010066635 A | 3/2010 |
| JP | 2010145854 A | 7/2010 |
| JP | 2011133912 A | 7/2011 |
| JP | 2013167823 A | 8/2013 |
| JP | 2013167824 A | 8/2013 |
| JP | 2014052439 A | 3/2014 |

OTHER PUBLICATIONS

Jul. 12, 2016, International Search Report issued in the International Patent Application No. PCT/JP2016/002023.

Oct. 31, 2017, International Preliminary Report on Patentability issued in the International Patent Application No. PCT/JP2016/002023.

Apr. 1, 2019, Office Action issued by the China National Intellectual Property Administration in the corresponding Chinese Patent Application No. 201680022107.3.

* cited by examiner

Transmittance characteristic relative to angle of inclination

Reflectance characteristic relative to angle of inclination

Transmittance characteristic relative to angle of inclination

Reflectance characteristic relative to angle of inclination

Transmittance characteristic relative to angle of inclination

Reflectance characteristic relative to angle of inclination

Transmittance characteristic relative to angle of inclination

Reflectance characteristic relative to angle of inclination

FIG. 14

| Ratio a:b | 6 : 9 | 8 : 11 | 8 : 9 | 10 : 9 | 8 : 7 |
|---|---|---|---|---|---|
| Simulation angle of inclination θ | 53° ≤ θ <90° | 55° ≤ θ <90° | 60° ≤ θ <90° | 66° ≤ θ <90° | 66° ≤ θ <90° |
| Device characteristic angle of inclination θ | 61° ≤ θ <90° | 55° ≤ θ <90° | 60° ≤ θ <90° | 66° ≤ θ <90° | 77° ≤ θ <90° |

POLARIZING ELEMENT

CROSS-REFERENCE TO RELATED APPLICATION

This application claims priority of Japanese Patent Application No. 2015-093351 (filed on Apr. 30, 2015), the entire disclosure of which is incorporated into this application for reference.

TECHNICAL FIELD

This disclosure relates to a polarizing element having a wire grid structure.

BACKGROUND

A polarizing element is an optical element that absorbs light polarized in one direction and transmits light polarized in a direction perpendicular to this direction. In principle, liquid-crystal displays are required to include polarizing elements. Particularly in the case of a liquid-crystal display that uses a high-intensity light source, such as a transmission-type LCD projector, a polarizing element needs to have excellent heat resistance due to being exposed to intense radiation, and is also demanded to have a size on the scale of a few centimeters and a high extinction ratio. Wire grid inorganic polarizing elements have been proposed in response to these demands (for example, refer to PTL 1 and 2).

A wire grid polarizing element has a structure in which many conductive wires (reflection layer) that extend in one direction are arranged on a substrate at a narrower pitch (tens of nanometers to hundreds of nanometers) than the operating wavelength band. When the polarizing element is irradiated with light, light that is polarized parallel to the extension direction of the wires (TE waves (S-waves)) cannot pass through the polarizing element, whereas light that is polarized perpendicularly to the extension direction of the wires (TM waves (P-waves)) can pass through the polarizing element. Wire grid polarizing elements have excellent heat resistance, can be made with a relatively large size, and have a high extinction ratio, which makes them suitable for LCD projector applications and the like.

For example, in the case of a wire grid polarizing element described in PTL 1, a grid structure layer in which protrusion-like lines are arranged at specific intervals is formed on a transparent substrate. The grid structure layer is formed from resin. Next, sputter etching is used to process tips of the protrusion-like lines into pointed shapes. Thereafter, oblique irradiation with metal particles is performed to form a metal layer around each tip of the grid structure layer made of resin.

In the case of a wire grid polarizing element described in PTL 2, metal wires are formed on a transparent substrate and then a dielectric layer and an absorption layer are provided thereon. Light polarized parallel to an extension direction of the wires (TE waves (S-waves)) is selectively absorbed by the dielectric layer and the absorption layer. By using this wire grid polarizing element in an LCD projector, it is possible to reduce deterioration of image quality caused by a ghost, or the like, generated when returning light that is reflected off the surface of the polarizing element is reflected again inside the LCD projector.

The TM wave (P-wave) transmittance of a polarizing element is preferably as high as possible. However, in the case of a conventional wire grid polarizing element, due to the relationship between the pitch and grid width, which is in accordance with the operating wavelength band, light transmittance decreases, in principle, toward shorter wavelengths from the design wavelength. In a visible light region used in an LCD projector (red band: wavelength $\lambda=600$ nm to 680 nm; green band: wavelength $\lambda=520$ nm to 590 nm; blue band: wavelength $\lambda=430$ nm to 510 nm), it is the blue band for which transmittance is lowest in the case of a polarizing element having a wavelength in the green band as a design wavelength. It is known that transmittance can be increased by making the grid width of a polarizing element narrower. However, in reality, it is difficult to form a pattern having a narrower grid width and it is also hard to ensure reliability.

CITATION LIST

Patent Literature

PTL 1: JP 2010-66635 A
PTL 2: JP 2014-52439 A

SUMMARY

Technical Problem

This disclosure aims to solve the various conventional problems set forth above and achieve the following objective. Specifically, an objective of this disclosure is to provide a wire grid polarizing element having an improved transmission axis direction light transmission characteristic.

Solution to Problem

This disclosure is based on the findings of the inventor and provides the following as a solution to the problems set forth above. Specifically, this disclosure provides:

<1> A polarizing element having a wire grid structure, comprising: a transparent substrate; and grid-shaped convexities that are arranged on the transparent substrate at a smaller pitch than a wavelength of operating band light and that extend in a specific direction, wherein the grid-shaped convexities include a reflection layer formed on the transparent substrate and grid tips formed with side surfaces that, when viewed in the specific direction, are inclined in a direction of tip tapering.

<2> The polarizing element according to the foregoing <1>, satisfying $2/3 \leq a/b \leq 8/7$, and $\theta_0 \leq \theta < 90°$, where $\theta$ represents an angle of inclination of the side surfaces of the grid tips relative to the transparent substrate, a represents height of the grid tips when viewed in the specific direction, b represents width of the grid-shaped convexities when viewed in the specific direction, and $\theta_0 = \arctan(2a/b)$.

<3> The polarizing element according to the foregoing <2>, wherein the angle of inclination $\theta$ is defined as an angle of inclination of a tangent to the side surfaces of the grid tips at a central position of the grid tips in a height direction when viewed in the specific direction.

<4> The polarizing element according to the foregoing <2> or <3>, wherein the angle of inclination $\theta$ satisfies $\theta \leq 80°$.

<5> The polarizing element according to any one of the foregoing <2> to <4>, wherein the polarizing element is designed for light of a specific wavelength in a visible light region and the angle of inclination θ is selected from a range of angles for which absorption axis direction reflectance of light of the specific wavelength is 10% or less.

<6> The polarizing element according to any one of the foregoing <1> to <5>, wherein the grid tips include, in order from a side corresponding to the transparent substrate, a reflection layer, a dielectric layer, and an absorption layer.

Advantageous Effect

According to this disclosure, it is possible to solve the various conventional problems set forth above, achieve the objective set forth above, and thus provide a wire grid polarizing element having an improved light transmission characteristic for light polarized in a transmission axis direction.

BRIEF DESCRIPTION OF THE DRAWINGS

In the accompanying drawings:

FIG. 14 is a table indicating ranges for the angle of inclination of grid tips with respect to ratios of the height a and width b of the grid tips;

DETAILED DESCRIPTION

The following describes disclosed embodiments with reference to the drawings.

<Polarizing Element Configuration>

Figure 1:
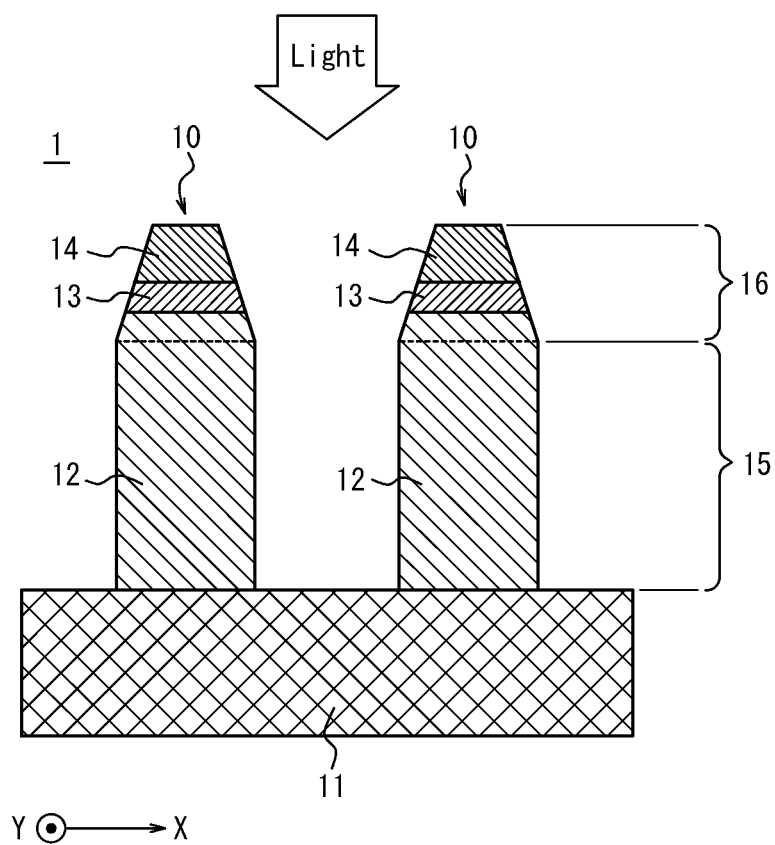
FIG. 1 is a cross-sectional view illustrating a polarizing element in which the disclosed techniques are adopted.

FIG. 1 is a schematic cross-sectional view illustrating a polarizing element 1 according to one disclosed embodiment. As illustrated in FIG. 1, the polarizing element 1 includes a transparent substrate 11 that is transparent with respect to operating band light, and also includes a reflection layer 12 on one surface of the transparent substrate 11, a dielectric layer 13 formed on the reflection layer 12, and an absorption layer 14 formed on the dielectric layer 13 that form grid-shaped convexities 10 arranged at a smaller pitch than the wavelength of operating band light. In other words, the polarizing element 1 has a one-dimensional grid-shaped wire grid structure in which the grid-shaped convexities 10, having the reflection layer 12, the dielectric layer 13, and the absorption layer 14 stacked in this order from the transparent substrate 11, are arranged at specific intervals on the transparent substrate 11.

When the grid-shaped convexities 10 are viewed in a direction in which the one-dimensional grid convexities of the grid-shaped convexities 10 extend (specific direction), the grid-shaped convexities 10 are divided into grid bases 15 having side surfaces that extend in parallel in a direction perpendicular to the transparent substrate 11 and grid tips 16 having side surfaces that are inclined in a direction of tapering toward tips of the grid-shaped convexities 10. The boundary between the grid bases 15 and the grid tips 16 is positioned in the reflection layer 12. In other words, the grid bases 15 are formed from part of the reflection layer 12 and the grid tips 16 are formed from part of the reflection layer 12, the dielectric layer 13, and the absorption layer 14. In the following description, a direction in which the one-dimensional grid convexities of the grid-shaped convexities 10 extend is referred to as the Y axis direction and a direction along the transparent substrate 11 that is perpendicular to the Y axis direction is referred to as the X axis direction. In this case, the polarizing element 1 is preferably irradiated with light from a direction that is perpendicular to the X axis direction and the Y axis direction, at a side of the transparent substrate 11 at which the grid-shaped convexities 10 are formed.

The absorption layer 14 is a material such as a metal or a semiconductor having a non-zero extinction coefficient as an optical constant. In other words, the absorption layer 14 is a material that displays a light absorption effect. The polarizing element 1 may further include a metal film of Ta, W, Nb, Ti, or the like as a diffusion barrier layer between the dielectric layer 13 and the absorption layer 14 to prevent diffusion of the absorption layer 14. Moreover, the polarizing element 1 may include a deposited protective film of $SiO_2$ or the like at an uppermost part to improve reliability in terms of moisture resistance or the like, as necessary, so long as any change in optical characteristics does not have an effect in application.

The polarizing element 1 exploits the four effects of transmission, reflection, interference, and selective light absorption of polarized light waves through optical anisotropy to attenuate polarized light waves having an electric field component parallel to the Y axis direction (TE waves (S-waves)) and transmit polarized light waves having an electric field component parallel to the X axis direction (TM waves (P-waves)). Accordingly, the Y axis direction is an absorption axis direction of the polarizing element 1 and the X axis direction is a transmission axis direction of the polarizing element 1.

TM waves that have passed through the absorption layer 14 and the dielectric layer 13 are also transmitted through the reflection layer 12 with a high transmittance. In contrast, TE waves are attenuated due to the light absorption effect of the absorption layer 14. The one-dimensional grid-shaped reflection layer 12 functions as a wire grid and reflects TE waves that have passed through the absorption layer 14 and the dielectric layer 13. Through appropriate adjustment of the thickness and refractive index of the dielectric layer 13, a portion of TE waves that are reflected by the reflection layer 12 are absorbed while passing through the absorption layer 14, and a portion of the TE waves are reflected and return to the reflection layer 12. Light that has passed through the absorption layer 14 is attenuated by interference. In this manner, the polarizing element 1 enables desired polarized light characteristics to be obtained through the selective attenuation of TE waves.

[Transparent Substrate]

The transparent substrate 11 is made from a material that is transparent with respect to operating band light and has a refractive index of 1.1 to 2.2. For example, the transparent substrate 11 may be made from glass, sapphire, rock crystal, or the like. In the present embodiment, it is preferable to use a rock crystal or sapphire substrate having high thermal conductivity as the constituent material of the transparent substrate 11. This provides the transparent substrate 11 with high light resistance against intense light and makes the transparent substrate 11 suitable for use as a polarizing element of an optical engine in a projector that generates a large amount of heat.

Moreover, when the transparent substrate 11 is formed from an optically active crystal such as rock crystal, excellent optical characteristics can be obtained by arranging the grid-shaped convexities 10 in a parallel direction or a perpendicular direction relative to the optic axis of the crystal. The optic axis is a directional axis for which the difference in refractive indices of an ordinary ray (O) and an extraordinary ray (E) of light travelling in the direction is smallest.

Depending on the intended application of the polarizing element 1, glass, and in particular quartz (refractive index 1.46) or soda lime glass (refractive index 1.51), may be used. No specific limitations are placed on the chemical composition of the glass material. For example, a cheap glass material such as silicate glass that is widely available as optical glass may be used so as to lower production costs.

[Reflection Layer]

The reflection layer 12 is an array of thin metal films that extend in a belt shape in the Y axis direction (absorption axis) on the transparent substrate 11. In other words, the reflection layer 12 functions as a wire grid polarizer, and among light radiated toward the surface of the transparent substrate 11 on which the wire grid is formed, the reflection layer 12 causes attenuation of polarized light waves (TE waves (S-waves)) having an electric field component in a parallel direction (Y axis direction) to the direction in which the convexities of the wire grid extend, and transmits polarized light waves (TM waves (P-waves)) having an electric field component in a perpendicular direction (X axis direction) to the direction in which the convexities of the wire grid extend.

No specific limitations are placed on the constituent material of the reflection layer 12 other than being a material that is reflective with respect to operating band light. For example, the constituent material of the reflection layer 12 may be a simple substance of a metal such as Al, Ag, Cu, Mo, Cr, Ti, Ni, W, Fe, Si, Ge, or Te, an alloy containing any of these metals, or a semiconductor material. Besides metal materials, it is possible to use a resin film or an inorganic film other than a metal that is provided with high surface reflectance through coloring or the like.

[Dielectric Layer]

The dielectric layer 13 is formed with a film thickness such that the phase of polarized light that has passed through the absorption layer 14 and been reflected by the reflection layer 12 is shifted by a half wavelength relative to polarized light reflected by the absorption layer 14. Specifically, the film thickness is appropriately set in a range of 1 nm to 500 nm that enables adjustment of the phase of polarized light and enables an increased interference effect.

The constituent material of the dielectric layer 13 may be a commonly used material, examples of which include metal oxides such as $SiO_2$, $Al_2O_3$, beryllium oxide, and bismuth oxide; $MgF_2$, cryolite, germanium, titanium dioxide, silicon, magnesium fluoride, boron nitride, boron oxide, tantalum oxide, and carbon, and combinations of any of the preceding examples. The refractive index of the dielectric layer 13 is preferably greater than 1.0 and no greater than 2.5. Polarizing element characteristics may be controlled through the material of the dielectric layer 13 since optical characteristics of the reflection layer 12 are also influenced by the refractive index at the periphery of the reflection layer 12.

[Absorption Layer]

The absorption layer 14 is made from at least one material having a non-zero extinction coefficient as an optical constant and displaying a light absorption effect, such as a metal or a semiconductor. The material of the absorption layer 14 is selected in accordance with the wavelength range of used light. Examples of metal materials that can be used include simple substances of Ta, Al, Ag, Cu, Au, Mo, Cr, Ti, W, Ni, Fe, and Sn, and alloys including any of these metals.

Examples of semiconductor materials that can be used include Si, Ge, Te, ZnO, and silicide materials (for example, β—$FeSi_2$, $MgSi_2$, $NiSi_2$, $BaSi_2$, $CrSi_2$, $CoSi_2$, and TaSi). As a result, the polarizing element 1 can be provided with a high extinction ratio with respect to the used visible light region.

Note that in the case of a semiconductor material, the band gap energy of the semiconductor is required to be no higher than the operating band because the band gap energy influences the absorption effect. For example, in use with visible light, it is necessary to use a material that absorbs at wavelengths of 400 nm or higher and thus has a band gap of 3.1 eV or lower.

The absorption layer 14 can be formed with a high film density by vapor deposition or sputtering. Moreover, the absorption layer 14 may include two or more layers formed from different materials.

The polarizing element 1 configured as described above can exploit the four effects of transmission, reflection, interference, and selective light absorption of polarized light waves to attenuate polarized light waves having an electric field component in the Y axis direction parallel to the grid of the reflection layer 12 (TE waves (S-waves)) and transmit polarized light waves having an electric field component in the X axis direction perpendicular to the grid (TM waves (P-waves)). In other words, TE waves are attenuated by the selective light absorption effect of polarized light waves by the absorption layer 14, and TE waves that have passed through the absorption layer 14 and the dielectric layer 13 are reflected by the grid-shaped reflection layer 12 that functions as a wire grid. Through appropriate adjustment of the thickness and refractive index of the dielectric layer 13, a portion of TE waves reflected by the reflection layer 12 can be reflected when passing through the absorption layer 14 such as to return to the reflection layer 12, and light that has passed through the absorption layer 14 can be attenuated by interference. In this manner, desired polarized light characteristics can be obtained through the selective attenuation of TE waves.

[Grid Tips]

The following describes the shape of the grid tips 16.

Figure 2:
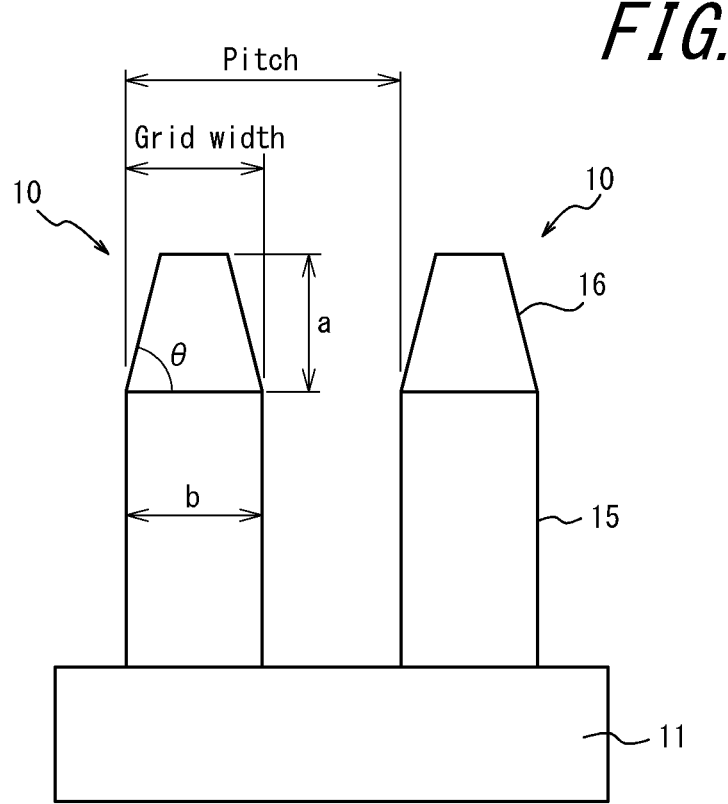
FIG. 2 illustrates parameters expressing the shape of the polarizing element in FIG. 1.
Figure 2:

FIG. 2 illustrates parameters expressing the shape of the polarizing element 1 illustrated in FIG. 1. In the following description, "height" refers to a dimension in a direction perpendicular to the surface of the transparent substrate 11 and "width" refers to a dimension in a direction (X axis direction) that perpendicularly intersects the height direction when viewed in a direction (Y axis direction) along the grid-shaped convexities 10.

Moreover, when the polarizing element 1 is viewed in the direction along the grid-shaped convexities 10 (Y axis direction), the repeated intervals between the grid-shaped convexities 10 in the X axis direction are referred to as the "pitch" and the width of each of the grid-shaped convexities 10 in the X axis direction is referred to as the "grid width". The pitch of the polarizing element 1 is smaller than the wavelength of operating band light. Moreover, each of the grid-shaped convexities 10 has a roughly constant width b in the X axis direction at the grid base 15 thereof and has a smaller width than b in the X axis direction at a part at a certain height or higher, close to the tip of the grid-shaped convexity 10. The part of the grid-shaped convexity 10 having a smaller width than b is the grid tip 16. The height of the grid tip 16 is referred to as "a". Moreover, the angle of inclination of the side surface of the grid tip 16 relative to the surface of the transparent substrate 11 is referred to as "e". In a case in which the angle of inclination θ of the side surface of the grid tip 16 is constant as illustrated in FIG. 2, the angle of inclination θ is an angle in a range $\theta_0 \le \theta < 90°$ where $\theta_0 = \arctan(2a/b)$.

Figure 3:
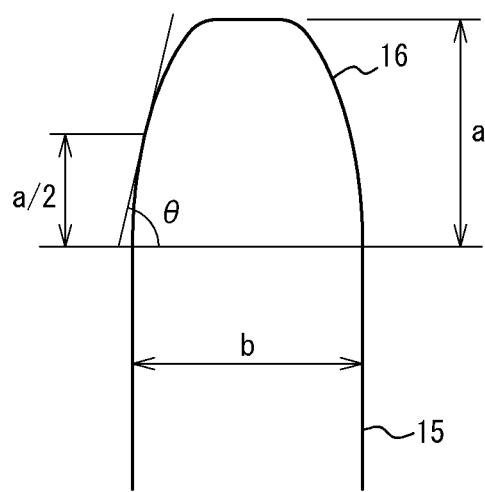
FIG. 3 illustrates the definition of an angle of inclination of a grid tip.

However, since the grid-shaped convexities 10 have an extremely fine structure, the actual shape of the grid tips 16 is slightly rounded as illustrated, for example, in FIG. 3. Therefore, the angle of inclination θ is defined as the angle of inclination of the side surface of the grid tip 16 relative to the transparent substrate 11 at a central position in terms of height of the grid tip 16 (i.e., a position at a height a/2).

Formation of the grid-shaped convexities 10 of the polarizing element 1 is carried out by, for example, forming films of the reflection layer 12, the dielectric layer 13, and the absorption layer 14 on the transparent substrate 11, and subsequently forming a grid-shaped mask pattern by nanoimprinting, photolithography, or the like. Parts of the reflection layer 12, the dielectric layer 13, and the absorption layer 14 at which the mask pattern is not formed are selectively removed by etching to produce a one-dimensional grid extending in a perpendicular direction relative to the transparent substrate 11. During this process, the grid tips 16 can be provided with inclined side surfaces through optimization of the etching conditions (gas flow rate, gas pressure, power, substrate cooling temperature).

<Evaluation of Optical Characteristics>

In this manner, the transmittance of TM waves is increased through the grid tips 16 each having a shape in which the side surface thereof is inclined in a direction of tapering. The reason for this improvement of TM wave transmittance is thought to be that the tapering of the grid tips 16 makes it difficult for scattering of incident light of variable angles to occur. The following describes optical characteristics of the polarizing element 1 using simulations and actual measurement results.

[Simulations]

FIGS. 4 to 13 illustrate a transmission axis transmittance characteristic and an absorption axis reflectance characteristic of the polarizing element 1, relative to the angle of inclination of the grid tips 16, as calculated by simulations for various ratios of the height (a) and width (b) of the grid tips 16. The term "transmission axis transmittance" refers to the transmittance of transmission axis direction (X axis direction) polarized light (TM waves) that is incident on the polarizing element 1, and the term "absorption axis reflectance" refers to the reflectance of absorption axis direction (Y axis direction) polarized light (TE waves) by the polarizing element 1. These graphs are each for a polarizing element 1 designed such as to be optimized for green band (wavelength 520 nm to 590 nm (specific wavelength)) light.

Figure 4:
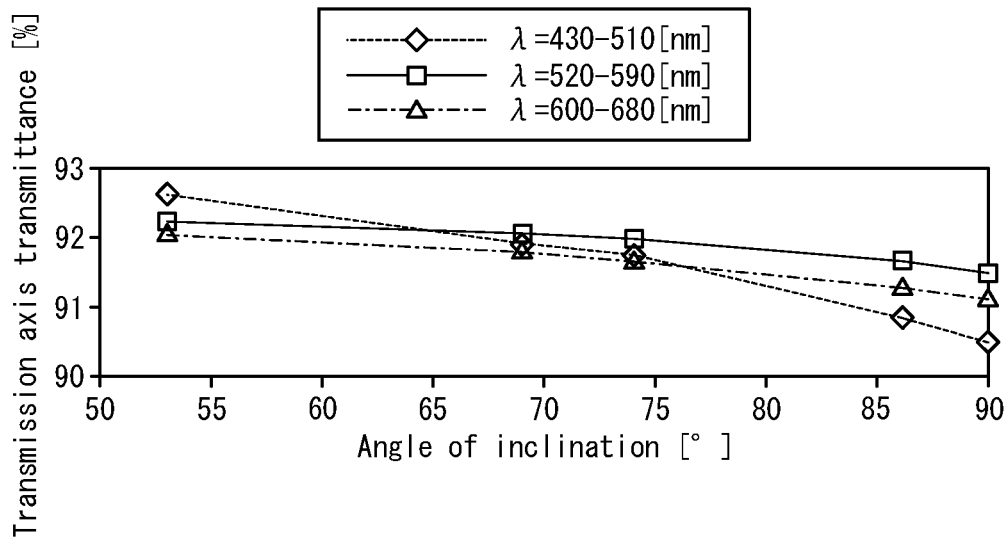
FIG. 4 is a graph illustrating a transmission axis transmittance characteristic of a polarizing element relative to the angle of inclination of grid tips as calculated by a simulation for a case in which the height a and width b of the grid tips have a ratio of 6:9.

FIG. 4 is a graph illustrating the transmission axis transmittance characteristic of the polarizing element 1 relative to the angle of inclination of the grid tip 16 as calculated by a simulation for a case in which the height a and width b of the grid tips 16 have a ratio of 6:9. A higher transmission axis transmittance indicates that a higher intensity of desired light is transmitted by the polarizing element 1. As illustrated in FIG. 4, for each of a blue band (wavelength λ=430 nm to 510 nm), a green band (wavelength λ=520 nm to 590 nm), and a red band (wavelength λ=600 nm to 680 nm), the transmittance increases as the angle of inclination θ becomes inclined from 90° (i.e., moving from right to left in the graph). In particular, there is a significant increase in the transmittance for the blue band.

Figure 5:
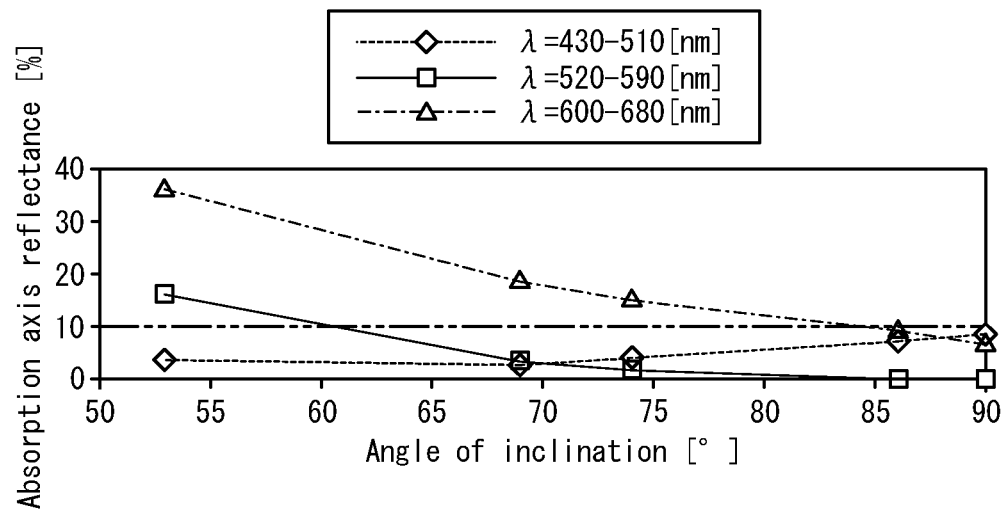
FIG. 5 is a graph illustrating an absorption axis reflectance characteristic of a polarizing element relative to the angle of inclination of grid tips as calculated by a simulation for a case in which the height a and width b of the grid tips have a ratio of 6:9.

On the other hand, FIG. 5 is a graph illustrating the absorption axis reflectance characteristic of the polarizing element 1 relative to the angle of inclination of the grid tips 16 as calculated by a simulation for the case in which the height a and width b of the grid tips 16 have a ratio of 6:9. A higher absorption axis reflectance indicates that the polarizing element 1 reflects light polarized in the absorption axis direction (TE waves) with a higher intensity. The absorption axis reflectance is preferably low because the reflected light mentioned above reduces the extinction ratio. In many LCD projector applications, there is demand for an absorption axis reflectance of less than 10%. According to FIG. 5, the absorption axis reflectance for the green band, which is the design wavelength of the polarizing element 1 in this simulation, increases as the angle of inclination θ decreases, and the absorption axis reflectance exceeds 10% when the angle of inclination θ is less than 61°. Therefore, permissible values for the angle of inclination θ in LCD projector applications satisfy 61°≤θ<90°. This angle is referred to as the "device characteristic angle of inclination". The reason that the absorption axis reflectance increases as the inclination of the grid tips 16 increases (i.e., as the angle of inclination θ decreases) is presumed to be that the absorption effect of the dielectric layer 13 and the absorption layer 14 with respect to reflected light (TE waves) decreases due to a decrease in the size of the dielectric layer 13 and the absorption layer 14 in a direction along the transparent substrate 11 as viewed in the direction illustrated in FIGS. 1 and 2 (Y axis direction).

Figure 6:
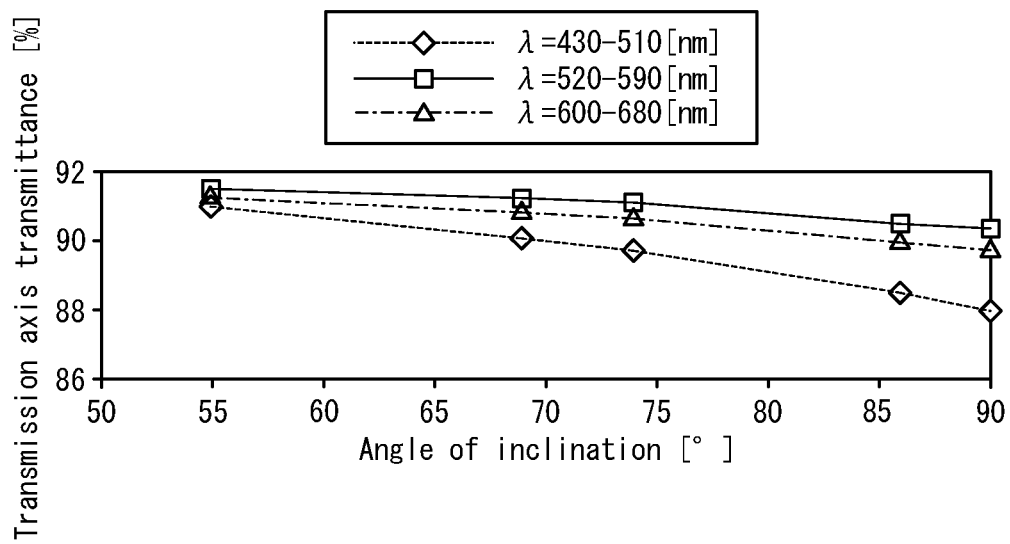
FIG. 6 is a graph illustrating a transmission axis transmittance characteristic of a polarizing element relative to the angle of inclination of grid tips as calculated by a simulation for a case in which the height a and width b of the grid tips have a ratio of 8:11.
Figure 7:
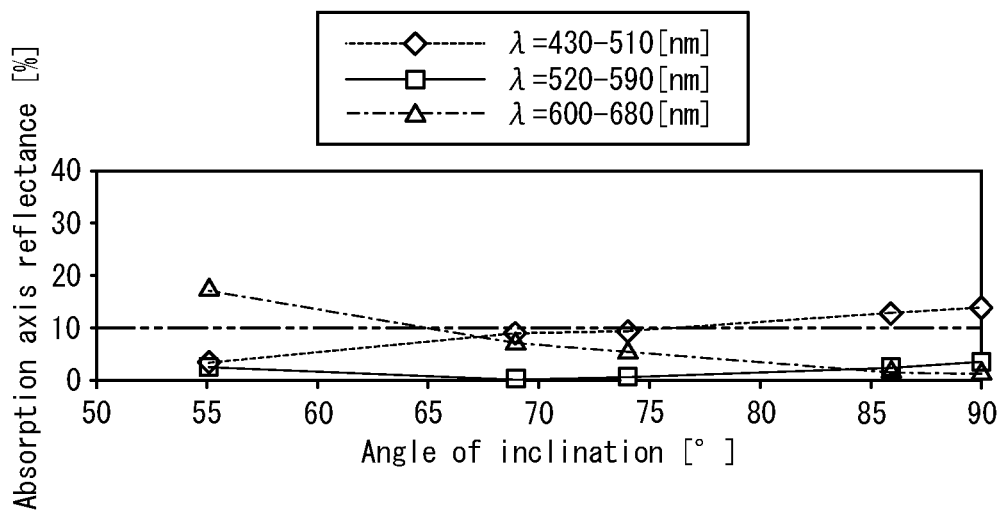
FIG. 7 is a graph illustrating an absorption axis reflectance characteristic of a polarizing element relative to the angle of inclination of grid tips as calculated by a simulation for a case in which the height a and width b of the grid tips have a ratio of 8:11.
Figure 8:
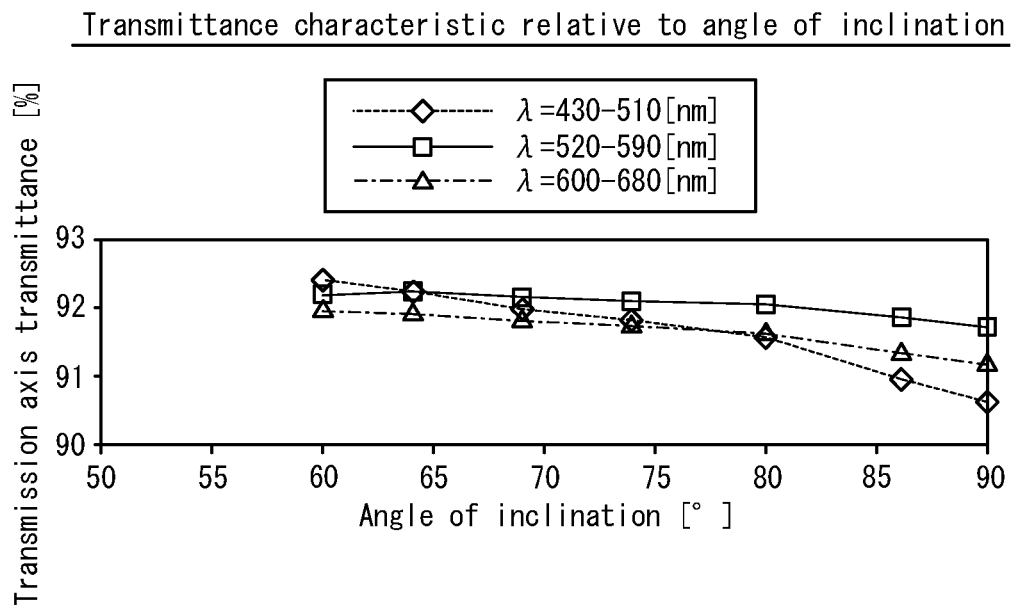
FIG. 8 is a graph illustrating a transmission axis transmittance characteristic of a polarizing element relative to the angle of inclination of grid tips as calculated by a simulation for a case in which the height a and width b of the grid tips have a ratio of 8:9.
Figure 9:
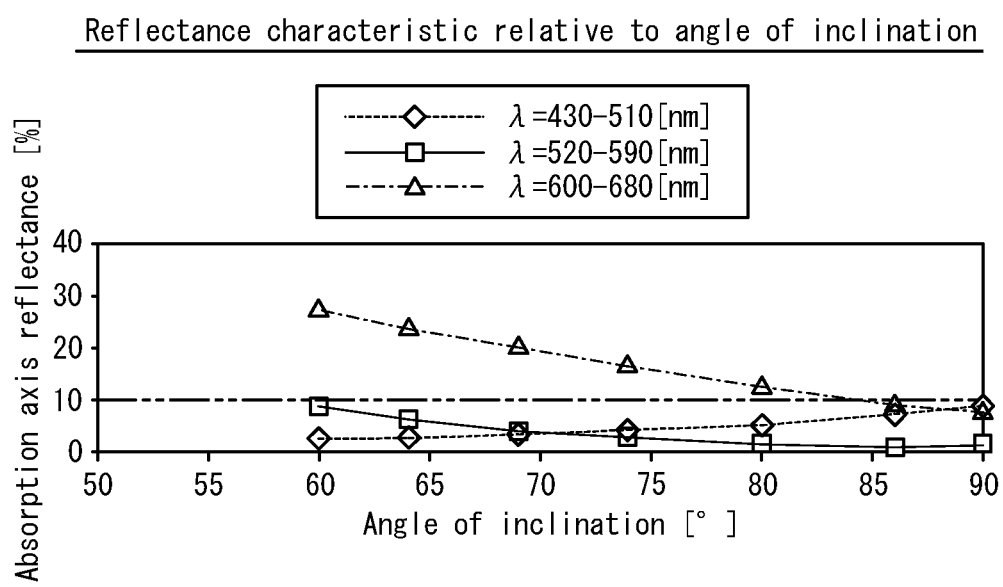
FIG. 9 is a graph illustrating an absorption axis reflectance characteristic of a polarizing element relative to the angle of inclination of grid tips as calculated by a simulation for a case in which the height a and width b of the grid tips have a ratio of 8:9.
Figure 10:
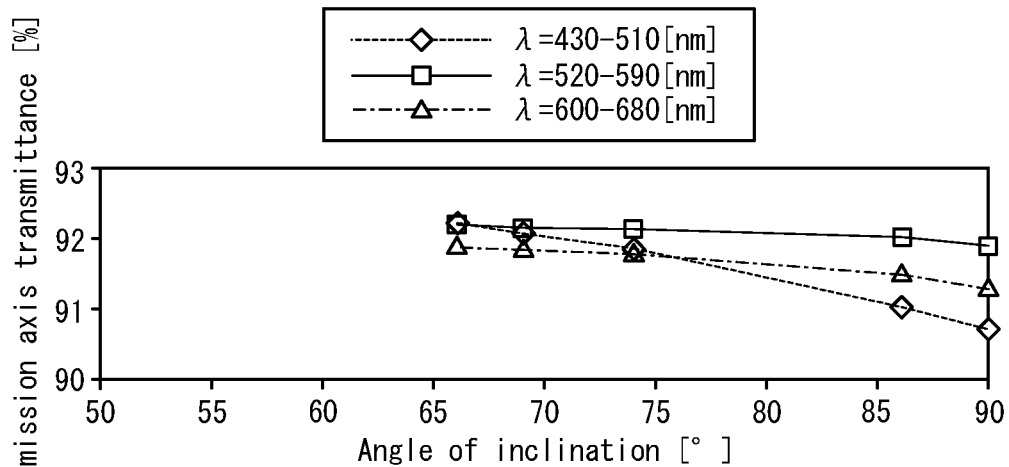
FIG. 10 is a graph illustrating a transmission axis transmittance characteristic of a polarizing element relative to the angle of inclination of grid tips as calculated by a simulation for a case in which the height a and width b of the grid tips have a ratio of 10:9.
Figure 11:
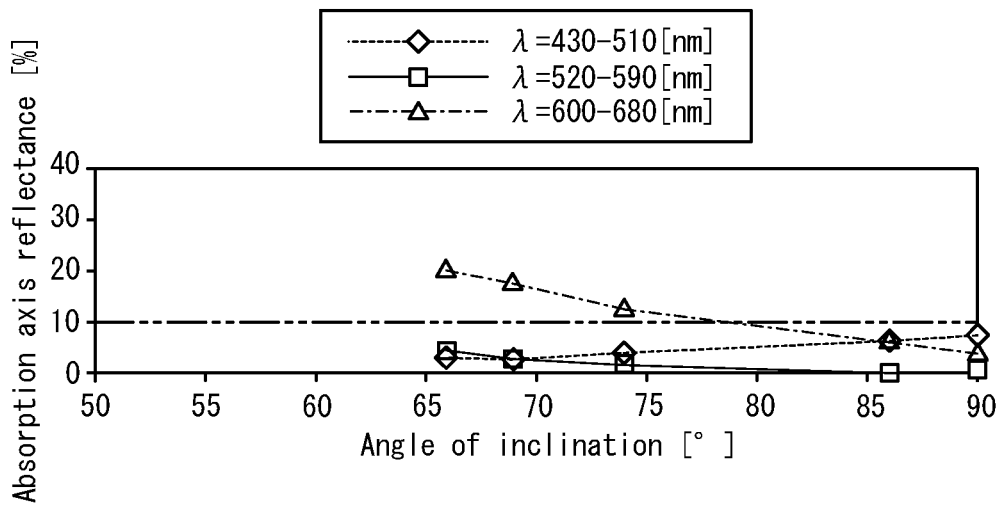
FIG. 11 is a graph illustrating an absorption axis reflectance characteristic of a polarizing element relative to the angle of inclination of grid tips as calculated by a simulation for a case in which the height a and width b of the grid tips have a ratio of 10:9.
Figure 12:
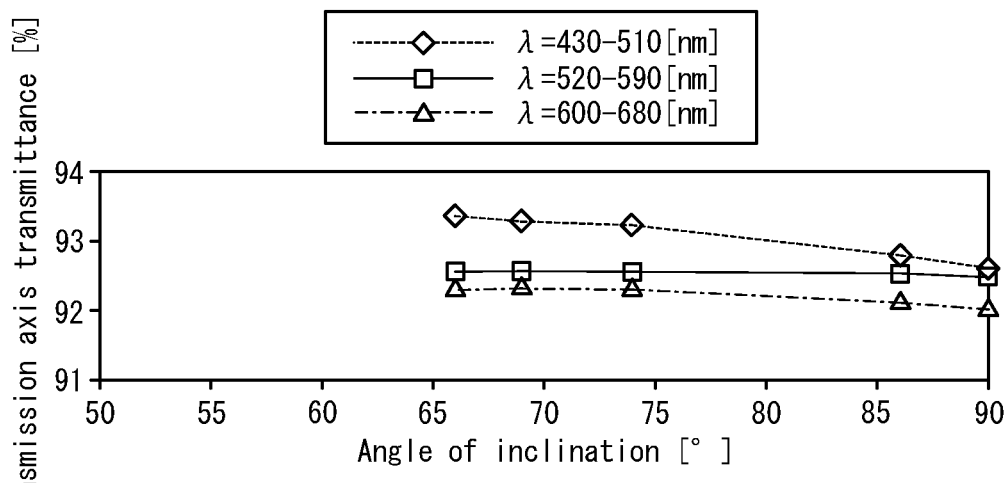
FIG. 12 is a graph illustrating a transmission axis transmittance characteristic of a polarizing element relative to the angle of inclination of grid tips as calculated by a simulation for a case in which the height a and width b of the grid tips have a ratio of 8:7.
Figure 13:
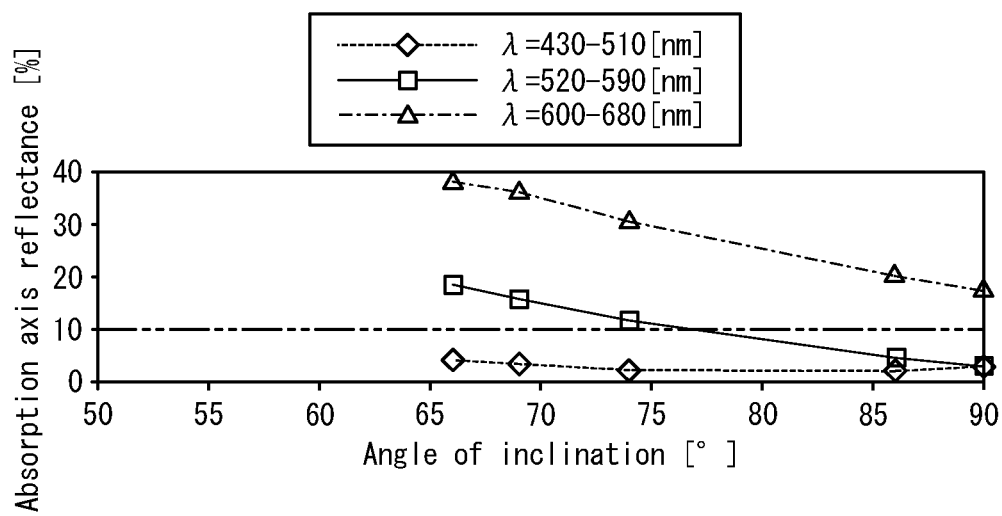
FIG. 13 is a graph illustrating an absorption axis reflectance characteristic of a polarizing element relative to the angle of inclination of grid tips as calculated by a simulation for a case in which the height a and width b of the grid tips have a ratio of 8:7.

In the same way as in FIGS. 4 and 5, the transmission axis transmittance characteristic and the absorption axis reflectance characteristic of the polarizing element 1, relative to the angle of inclination of the grid tips 16, are illustrated in FIGS. 6 and 7 for a case in which the height a and width b of the grid tips 16 have a ratio of 8:11, in FIGS. 8 and 9 for a case in which the height a and width b of the grid tips 16 have a ratio of 8:9, in FIGS. 10 and 11 for a case in which the height a and width b of the grid tips 16 have a ratio of 10:9, and in FIGS. 12 and 13 for a case in which the height a and width b of the grid tips 16 have a ratio of 8:7. Regardless of the ratio of the height a and width b of the grid tips 16, improvement of the transmission axis transmittance is observed for each of the blue band, the green band, and the red band as the inclination of the side surfaces of the grid tips 16 increases (i.e., as the angle of inclination θ decreases). Moreover, in each case, the increase in the transmission axis transmittance for the blue band is greater than for the other bands. On the other hand, in the case in which the height a and width b of the grid tips 16 have a ratio of 8:7, the absorption axis reflectance of light having a wavelength in the green band exceeds 10% when θ<77° as illustrated in FIG. 13. Accordingly, the device characteristic angle of inclination in this case is 77°≤θ<90°. Moreover, in the case in which the height a and width b of the grid tips 16 have a ratio of 8:9, the effect of improving the transmission axis transmittance characteristic as the side surfaces of the grid tips 16 are inclined is large as illustrated in FIG. 8, and the angle of inclination θ can be set as 60°≤θ<90°.

FIG. 14 is a table indicating ranges for the angle of inclination θ of the grid tips 16, relative to the ratio of the height a and width b of the grid tips 16, based on the results of the simulations illustrated in FIGS. 4 to 13. In the table, the "simulation angle of inclination θ" is the angle of inclination range for which the simulation was performed and, as already explained, is a range of $\theta_0 \le \theta < 90°$ ($\theta_0$=arctan (2a/b)). In the examples illustrated in FIGS. 4 to 13, it was confirmed that the transmission axis transmittance of light in each wavelength band increases in the range of the angle of inclination θ for each range included in ⅔≤a/b≤⁸⁄₇, where a/b represents the ratio of the height a and width b of the shape of the grid tips 16. As previous explained, the "device characteristic angle of inclination" refers to an angle of inclination in a range in which the absorption axis reflectance does not exceed 10%. In a situation in which the polarizing element 1 is to be used in an LCD projector or the like, the angle of inclination θ preferably satisfies the range for this device characteristic angle of inclination.

[Comparison of Actual Measurement Results and Simulations]

Figure 15:
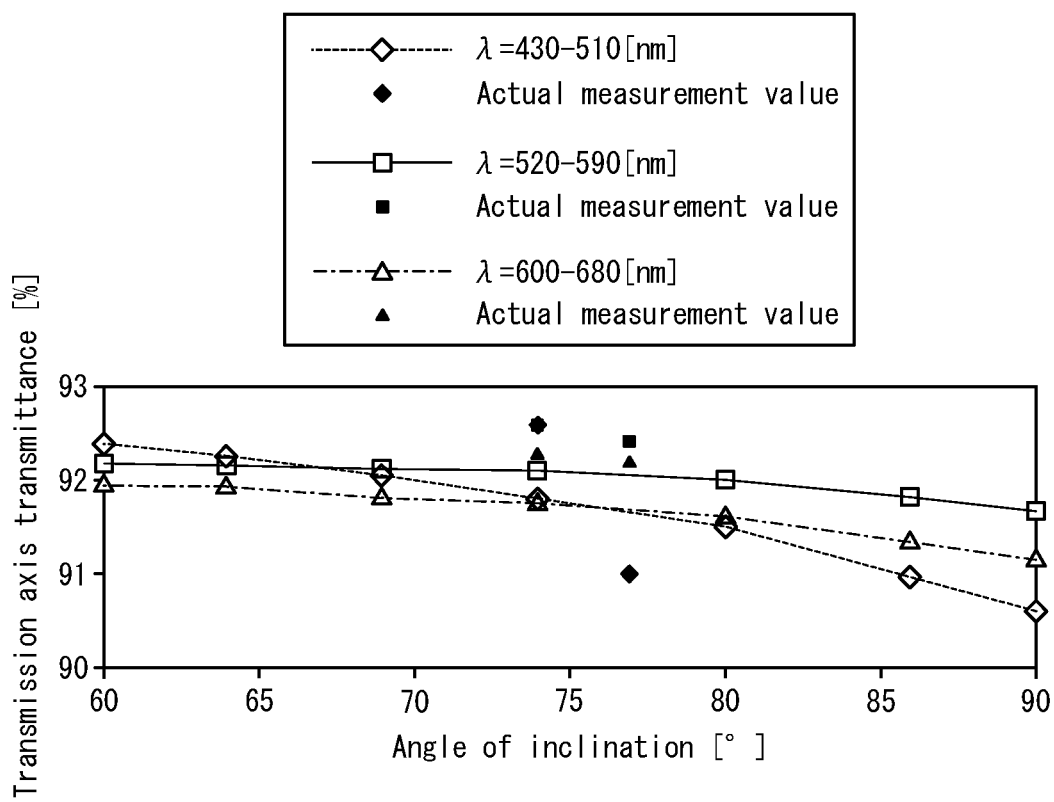
FIG. 15 is a graph illustrating actual measurement values and simulation values, in comparison, for a transmission axis transmittance characteristic of a polarizing element relative to the angle of inclination of grid tips for a case in which the height a and width b of the grid tips have a ratio of 8:9.

The following describes the results of comparison of the simulation results with a transmission axis transmittance characteristic obtained when an actual polarizing element 1 having a wire grid structure was produced. FIG. 15 is a graph illustrating actual measurement results and simulation results, in comparison, for the transmission axis transmittance characteristic of the polarizing element 1 relative to the angle of inclination θ of the side surfaces of the grid tips 16 for a case in which the height a and width b of the grid tips 16 have a ratio of 8:9.

In FIG. 15, white marks indicate the same simulation results as illustrated in FIG. 8, whereas black marks indicate actual measurement values for a case in which the average value of the angle of inclination θ is 77° and a case in which the average value of the angle of inclination θ is 74°. In the case in which the average value of the angle of inclination θ is 74°, the actual measurement value for the blue band (wavelength λ=430 nm to 510 nm) and the actual measurement value for the green band (wavelength λ=520 nm to 590 nm) are overlapping at approximately 92.6%. Note that the average value of the angle of inclination θ is used because, when an actual polarizing element 1 is produced, there is variation in the angle of inclination of the side surfaces of the grid tips 16.

FIG. 15 indicates that even with actual measurement results, the transmission axis transmittance is higher for each of the bands in the case in which the average value of the of the angle of inclination θ is 74° than in the case in which the average value of the angle of inclination θ is 77°. In particular, the transmission axis transmittance is significantly improved in the blue band. The above demonstrates that the transmission axis transmittance is improved through inclination of the side surfaces of the grid tips 16 (i.e., through reduction of the angle of inclination θ).

FIGS. 16 to 19 illustrate actual measurement results for a transmission axis transmittance characteristic, an absorption axis transmittance characteristic, a transmission axis reflectance characteristic, and an absorption axis reflectance characteristic of each of two actual polarizing elements 1 that were produced. The term "absorption axis transmittance" refers to the transmittance of absorption axis direction (Y axis direction) polarized light (TE waves) that is incident on the polarizing element 1, and the term "transmission axis reflectance" refers to the reflectance of transmission axis direction (X axis direction) polarized light (TM waves) that is incident on the polarizing element 1. In each of these graphs, a solid line indicates a polarizing element for which the angle of inclination θ of side surfaces of grid tips 16 varies in a range of 80° to 84° and a dashed line indicates a polarizing element for which the angle of inclination θ of side surfaces of grid tips 16 varies in a range of 76° to 80°. (Note that the grid height (a) and width (b) of these two polarizing elements have respective ratios of approximately ⅔ and ⁸⁄₁₁, which are close to each other.)

Figure 16:
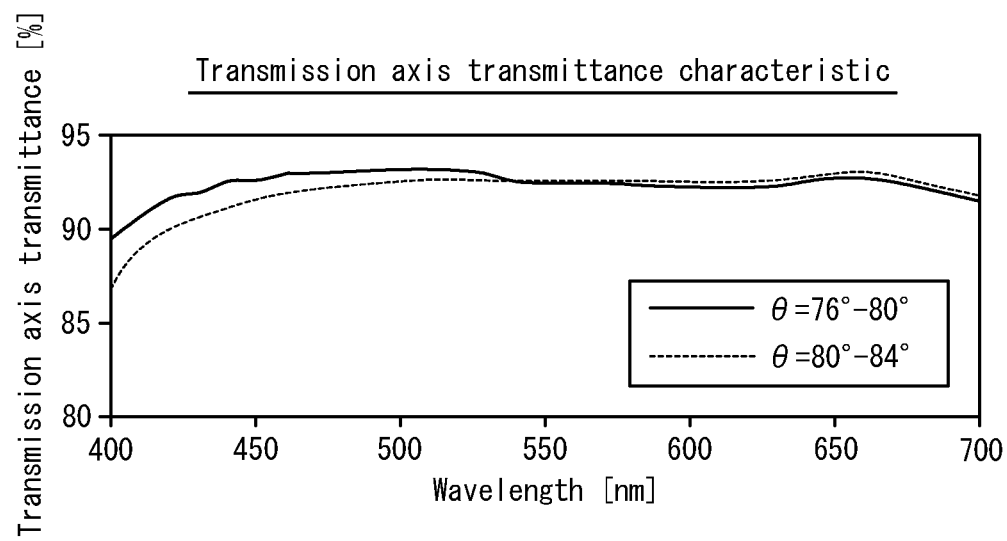
FIG. 16 is a graph illustrating actual measurement values of a transmission axis transmittance characteristic for different angles of inclination θ.

It can be seen from FIG. 16 that the transmission axis transmittance, which indicates transmittance of TM waves by the polarizing element 1, is significantly improved, particularly in the blue band (wavelength λ=430 nm to 510 nm), when the angle of inclination θ of the side surfaces of the grid tips 16 is reduced. Moreover, when the angle of inclination θ is 76° to 80°, the transmission axis transmittance is substantially constant at approximately 92% to 93% in a visible light region including the blue band for which the wavelength is 430 nm or higher, regardless of wavelength, and transmittance is sufficiently improved. Therefore, the transmittance improvement effect of the disclosed techniques is considered to be large when the angle of inclination θ is 80° or less. Note that in the examples of simulations illustrated in FIGS. 4, 8, and 10, when the angle of inclination θ is 80° or less, differences between the blue band, the green band, and the red band in terms of the transmission axis transmittance are small values in a range of approximately 0.5% to 1%. Consequently, there is uniform transmission of light by the polarizing element 1 for each wavelength band, which minimizes color variation.

Figure 17:
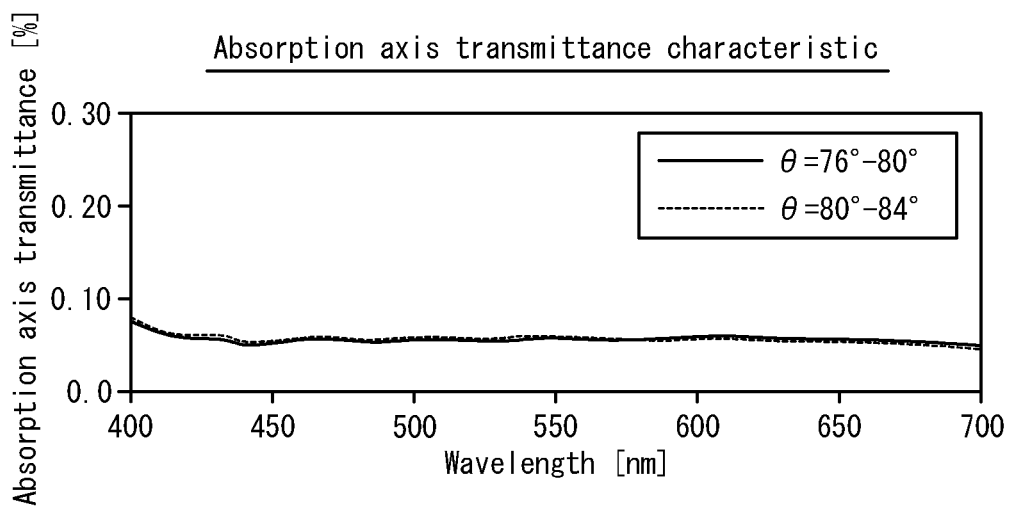
FIG. 17 is a graph illustrating actual measurement values of an absorption axis transmittance characteristic for different angles of inclination θ.
Figure 18:
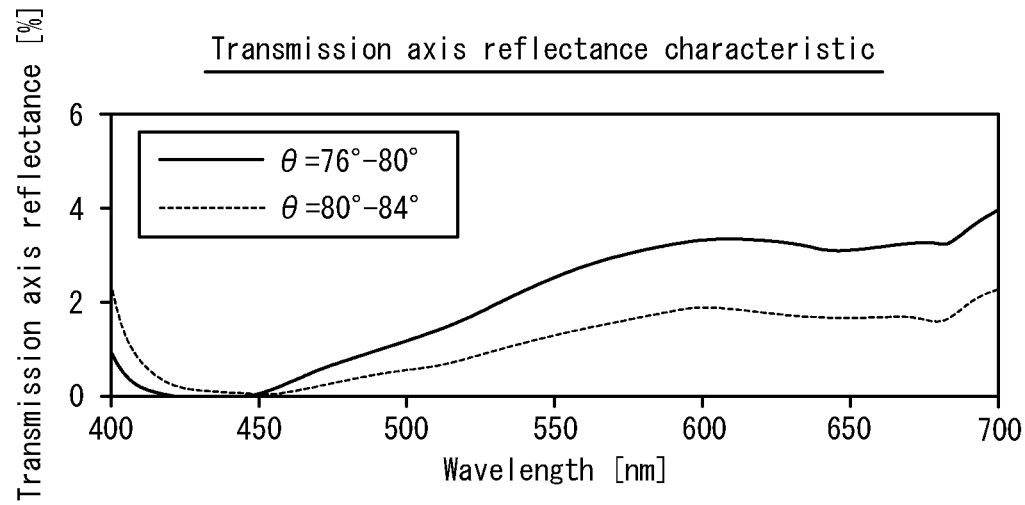
FIG. 18 is a graph illustrating actual measurement values of a transmission axis reflectance characteristic for different angles of inclination θ.
Figure 19:
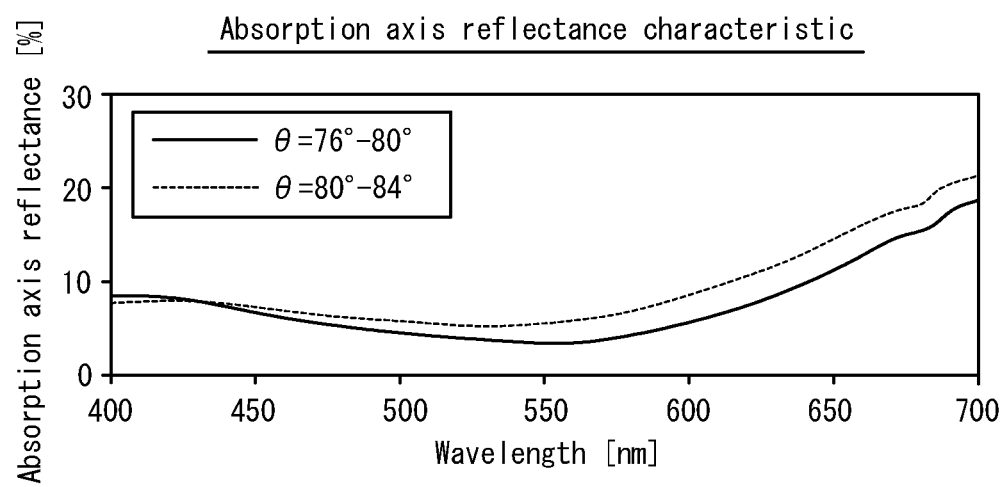
FIG. 19 is a graph illustrating actual measurement values of an absorption axis reflectance characteristic for different angles of inclination θ.

In contrast, the absorption axis transmittance illustrated in FIG. 17, which indicates the transmittance of TE waves, is hardly influenced at all by a change in the angle of inclination θ. Moreover, the transmission axis reflectance illustrated in FIG. 18, which indicates the reflectance of TM waves, is almost 0 at a wavelength of 450 nm, and increases with increasing deviation from this wavelength. However, the transmission axis reflectance is smaller than the absorption axis reflectance illustrated in FIG. 19, which indicates the reflectance of TE waves.

As explained above, the disclosed polarizing element 1 enables improvement of transmittance of light that is polarized in the transmission axis direction through control of the angle of inclination of the side surfaces of the grid tips 16 in the grid-shaped convexities 10 of the wire grid structure. In the visible light region, the effect of improving transmittance is particularly large for light at the short wavelength end of the region, inclusive of the blue band. In the disclosed techniques, only the shape of the grid tips 16 is changed, rather than the overall shape of the grid-shaped convexities 10, and thus the basic structure is the same as in conventional techniques such as described in PTL 2. Therefore, there is no change from conventional polarizing elements in terms of difficulty of production, and reliability can also be maintained.

Note that the disclosed techniques are not limited to the embodiment set forth above and various alterations may of course be made within the essential scope thereof. Moreover, the drawings are schematic illustrations and thus the ratio of dimensions and so forth may differ from reality. Specific dimensions and so forth should be judged in consideration of the above description. Furthermore, there may of course also be differences between the drawings in terms of the relationship and ratio of dimensions.

In the embodiment set forth above, the results of simulations and actual measurements are provided for an example in which a polarizing element is designed with the green band as a design wavelength, but the disclosed polarizing element is not limited to being a polarizing element having a wavelength in the green band as a design wavelength. In other words, the "specific wavelength" can be selected from wavelengths in any visible light region and is not limited to being a wavelength in the green band (520 nm to 590 nm). The above-described improvement of transmission axis transmittance achieved by providing the grid tips with a tapered shape can expected whichever wavelength is adopted as the design wavelength. In particular, a large effect can be expected at a short wavelength side of the design wavelength. In a situation in which a wavelength outside of the green band is adopted as the design wavelength, the absorption axis reflectance with respect to the design wavelength can still be reduced by adjusting the film thickness, refractive index, and so forth of the dielectric layer. Therefore, it is possible to ensure a device characteristic angle of inclination range for which the absorption axis reflectance is 10% or less. Although the boundary between the grid bases and the grid tips is positioned in a reflection layer, and although the grid tips include a reflection layer, a dielectric layer, and an absorption layer in the embodiment set forth above, this is not a limitation. So long as the grid tips have a tapered shape, the grid tips may be formed from an absorption layer and a dielectric layer without including a reflection layer, or may be formed from just an absorption layer. However, inclusion of a reflection layer in the grid tips does enable significant improvement of the transmittance of TM waves passing through the polarizing element 1. It should also be noted that the disclosed polarizing element is not limited to LCD projector applications. The disclosed polarizing element can be adopted for various applications as a polarizing element having high transmittance with respect to light polarized in the transmission axis direction.

INDUSTRIAL APPLICABILITY

The disclosed polarizing element has a high extinction ratio and is, therefore, suitable for adoption as a polarizing element used in an LCD projector.

REFERENCE SIGNS LIST 1 polarizing element
10 grid-shaped convexity
11 transparent substrate
12 reflection layer
13 dielectric layer
14 absorption layer
15 grid base
16 grid tip

The invention claimed is:
1. A polarizing element having a wire grid structure, comprising:
a transparent substrate; and
grid-shaped convexities that are arranged on the transparent substrate at a smaller pitch than a wavelength of operating band light and that extend in a specific direction, wherein
the grid-shaped convexities include a reflection layer formed on the transparent substrate and, when viewed in the specific direction, are divided into grid bases having side surfaces that extend in parallel in a direction perpendicular to the transparent substrate and grid tips formed with side surfaces that are inclined so that the grid tips are tapered in the specific direction,
the grid tips include, in order from a side corresponding to the transparent substrate, a reflection layer, a dielectric layer, and an absorption layer,
width of the reflection layer furthest from the substrate is equal to maximum width of the dielectric layer, the maximum width of the dielectric layer being equal to width of the dielectric layer closest to the substrate,
minimum width of the dielectric layer is equal to maximum width of the absorption layer, the maximum width of the absorption layer being equal to width of the absorption layer closest to the substrate,
the width of the reflection layer furthest from the substrate is larger than the minimum width of the dielectric layer, and the minimum width of the dielectric is larger than minimum width of the absorption layer, the dielectric layer and the absorption layer are arrays of films extending in a band shape, the dielectric layer and the absorption layer are positioned internal side of the side surfaces and have a width equal to the grid tips, when viewed in the specific direction, according to a distance from the transparent substrate, the polarizing element satisfies $2/3 \leq a/b \leq 8/7$, and $\theta_0 \leq \theta < 90°$, where $\theta$ represents an angle of inclination of the side surfaces of the grid tips relative to the transparent substrate, a represents height of the grid tips when viewed in the specific direction, b represents width of the grid-shaped convexities when viewed in the specific direction, and $\theta_0 = \arctan(2a/b)$, and the polarizing element is designed for light of a specific wavelength in a visible light region and the angle of inclination $\theta$ is selected from a range of angles for which absorption axis direction reflectance of light of the specific wavelength is 10% or less.

2. The polarizing element according to claim 1, wherein the angle of inclination $\theta$ is defined as an angle of inclination of a tangent to the side surfaces of the grid tips at a central position of the grid tips in a height direction when viewed in the specific direction.

3. The polarizing element according to claim 1, wherein the angle of inclination $\theta$ satisfies $\theta \leq 80°$.

4. The polarizing element according to claim 1, wherein the dielectric layer is formed with a predefined film thickness.

5. The polarizing element according to claim 1, wherein an interface between the reflection layer and the dielectric layer is substantially flat.

* * * * *